US008848354B2

(12) United States Patent
Sung et al.

(10) Patent No.: US 8,848,354 B2
(45) Date of Patent: Sep. 30, 2014

(54) HINGE STRUCTURE AND ELECTRONIC DEVICE USING THE SAME

(71) Applicant: Acer Incorporated, New Taipei (TW)

(72) Inventors: Pei-Yang Sung, New Taipei (TW); Shun-Bin Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 13/861,388

(22) Filed: Apr. 12, 2013

(65) Prior Publication Data
US 2014/0192461 A1     Jul. 10, 2014

(30) Foreign Application Priority Data

Jan. 8, 2013  (TW) .............................. 102100600 A

(51) Int. Cl.
H05K 5/00    (2006.01)
H05K 7/00    (2006.01)
G06F 1/16    (2006.01)
E05D 7/00    (2006.01)
E05D 3/02    (2006.01)

(52) U.S. Cl.
CPC .. E05D 7/00 (2013.01); E05D 3/02 (2013.01); G08F 1/1613 (2013.01)
USPC ............ 361/679.27; 361/679.01; 361/679.26; 361/679.55

(58) Field of Classification Search
USPC .............. 361/679.01, 679.26, 679.27, 679.55
See application file for complete search history.

(56) References Cited

U.S. PATENT DOCUMENTS

| | | | | |
|---|---|---|---|---|
| 6,430,038 B1 * | 8/2002 | Helot et al. | ............... | 361/679.05 |
| 6,437,973 B1 * | 8/2002 | Helot et al. | ............... | 361/679.29 |
| 6,504,707 B2 * | 1/2003 | Agata et al. | ............... | 361/679.05 |
| 6,816,365 B2 * | 11/2004 | Hill et al. | .................. | 361/679.44 |
| 7,035,090 B2 * | 4/2006 | Tanaka et al. | ............ | 361/679.21 |
| 8,520,377 B2 * | 8/2013 | Senatori | .................... | 361/679.27 |
| 2005/0052833 A1 * | 3/2005 | Tanaka et al. | ................. | 361/681 |

* cited by examiner

Primary Examiner — Anthony Haughton
(74) Attorney, Agent, or Firm — Jianq Chyun IP Office

(57) ABSTRACT

A hinge structure suited for connecting between a first body and a second body is provided, such that the first and the second bodies can rotate in relative to each other. The hinge structure includes a first pivoting member, a second pivoting member, and a third pivoting member. The first pivoting member has a first fixing portion fixed to the first body and a first winding portion extending from the first fixing portion. The second pivoting member has a second fixing portion fixed to the first body and a second winding portion extending from the second fixing portion. The third pivoting member is disposed on the second body and has a shaft. The first winding portion and the second winding portion respectively wind around the shaft. The first fixing portion and the second fixing portion are located at opposite sides of the shaft. An electronic device is also provided.

14 Claims, 6 Drawing Sheets

HINGE STRUCTURE AND ELECTRONIC DEVICE USING THE SAME

CROSS-REFERENCE TO RELATED APPLICATION

This application claims the priority benefit of Taiwan application serial no. 102100600, filed on Jan. 8, 2013. The entirety of the above-mentioned patent application is hereby incorporated by reference herein and made a part of this specification.

BACKGROUND

1. Field of the Application

The invention relates to a hinge structure, and more particularly, to a hinge structure of an electronic device.

2. Description of Related Art

Portable computing devices, such as handheld computers, portable computers, notebook computers, tablet PCs, and personal digital assistants (PDA), have become more and more common. In general, the portable computing device uses a base unit and a display assembly configured for displaying the base unit to comply with user operation and viewing purposes. In particular, as touch display technology advances with years, in terms of the portable computers, touch screens have gradually become the basic equipments.

Taking the notebook computer as an example, a hinge between two bodies is used as a mechanism for causing movements of the bodies. However, once a touch screen is added, at the same time the bodies are expanded, the hinge still requires being able to support a force applied by a user on the touch screen. Nevertheless, the conventional hinge structure is easily prone to body vibrations when rotating the touch screen or operating the touch screen, thereby causing difficulties in operation.

SUMMARY OF THE APPLICATION

The invention provides a hinge structure and an electronic device using the same, so as to provide a use with a stable operation interface.

In an embodiment of the invention, a hinge structure suited for connecting between a first body and a second body is provided, such that the first body and the second body can rotate in relative to each other. The hinge structure includes a first pivoting member, a second pivoting member and a third pivoting member. The first pivoting member has a first fixing portion and a first winding portion extending from the first fixing portion. The first fixing portion is fixed on the first body. The second pivoting member has a second fixing portion and a second winding portion extending from the second fixing portion. The second fixing portion is fixed on the first body. The third pivoting member is disposed on the second body. The third pivoting member has a shaft, wherein the first winding portion and the second winding portion respectively wind around the shaft, and the first fixing portion and the second fixing portion are located at two opposite sides of the shaft.

In an embodiment of the invention, an electronic device including a first body, a second body and a hinge structure connected between the first body and the second body is provided. The hinge structure includes a first pivoting member, a second pivoting member and a third pivoting member. The first pivoting member has a first fixing portion and a first winding portion extending from the first fixing portion. The first fixing portion is fixed on the first body. The second pivoting member has a second fixing portion and a second winding portion extending from the second fixing portion. The second fixing portion is fixed on the first body. The third pivoting member is disposed on the second body. The third pivoting member has a shaft, wherein the first winding portion and the second winding portion respectively wind around the shaft, and the first fixing portion and the second fixing portion are located at two opposite sides of the shaft.

According to the foregoing, via the first fixing portion and the second fixing portion disposed on the first body, and by enabling the shaft of the third pivoting member to be located between the first fixing portion and the second fixing portion, namely, by enabling the first winding portion of the first pivoting member and the second winding portion of the second pivoting member to wind from the two opposite sides of the shaft onto the shaft, the first and the second fixing portions located at the two opposite sides of the shaft would both generate corresponding reverse vibrations when the first body rotates in relative to the second body, and with an counteract effect of the corresponding reverse vibrations, the first body is maintained in a non-vibrating state.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
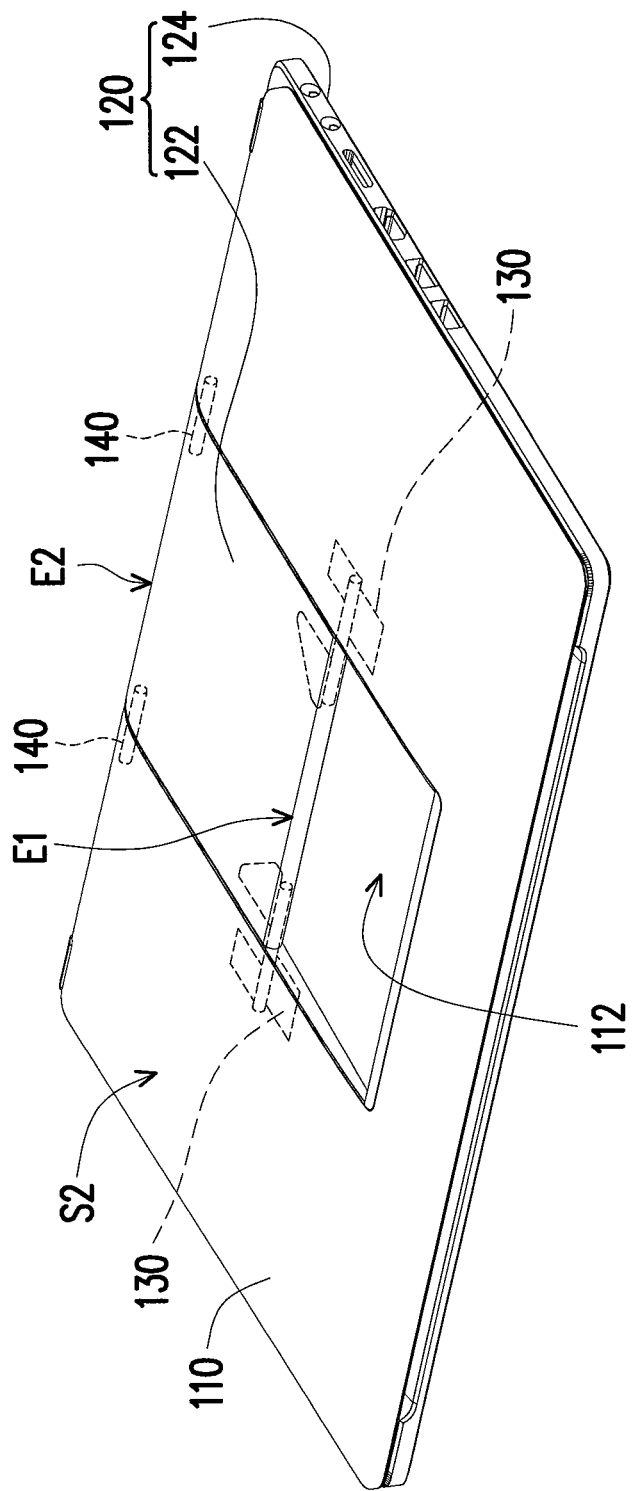
FIG. 1 is a schematic diagram illustrating an electronic device according to an embodiment of the invention.
Figure 2:
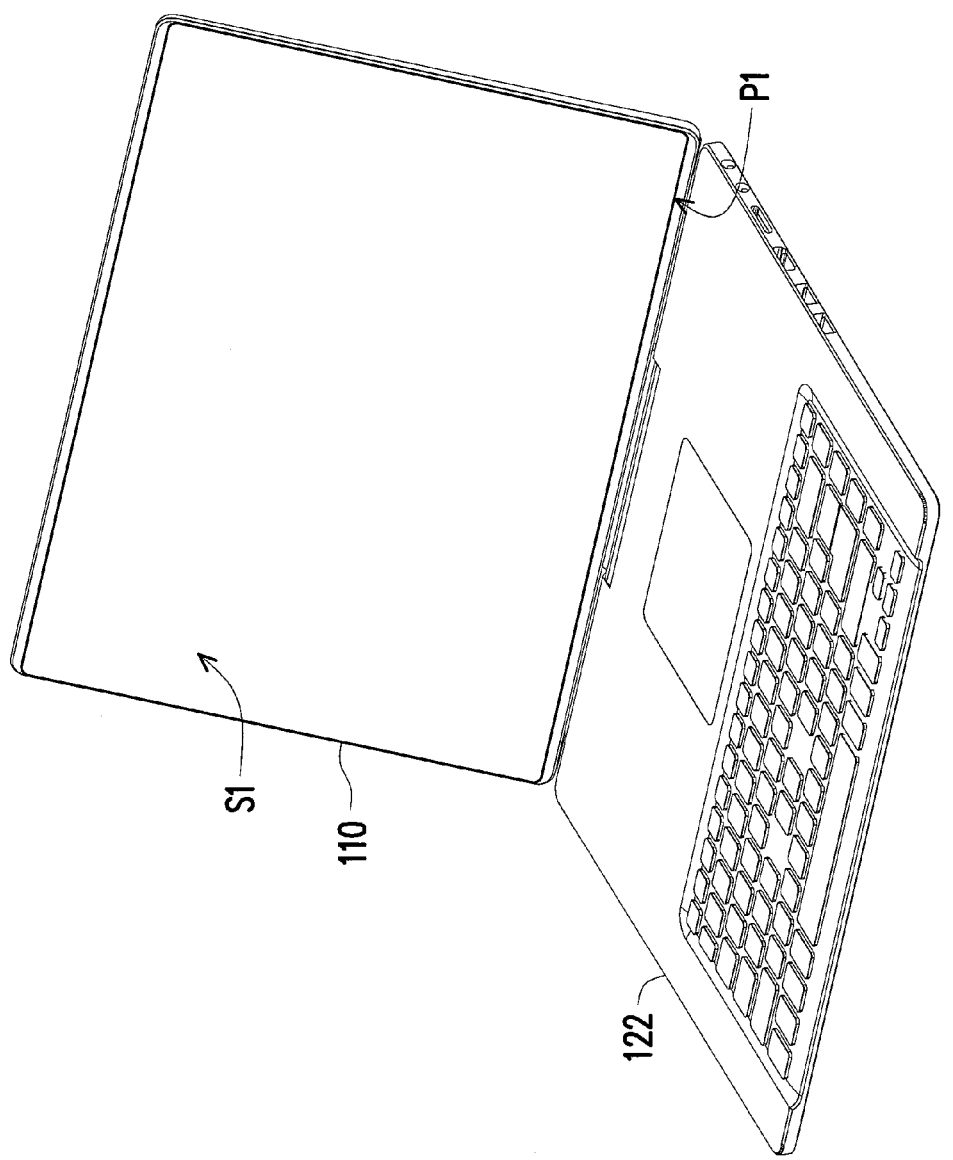
FIG. 2 and FIG. 3 are schematic diagrams respectively illustrating the electronic device in FIG. 1 at different states.
Figure 3:
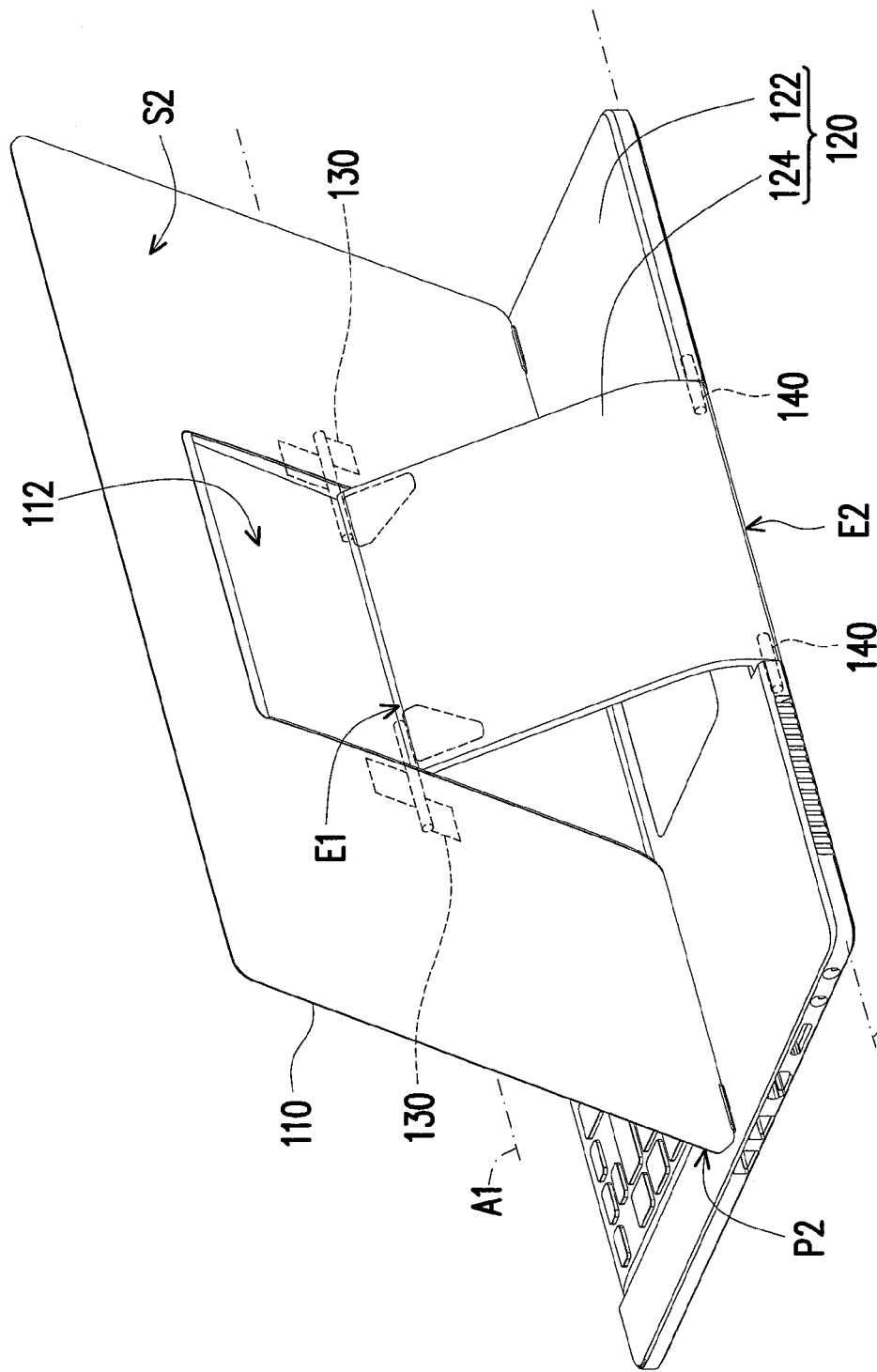

FIG. 1 is a schematic diagram illustrating an electronic device according to an embodiment of the invention. FIG. 2 and FIG. 3 are schematic diagrams respectively illustrating the electronic device in FIG. 1 at different states. Referring to FIG. 1 through FIG. 3, in the present embodiment, an electronic device 100, for example, is a notebook computer, and has a first body 110, a second body 120 and a first hinge structure 130 and a second hinge structure 140, wherein the first body 110, for example, is a display element of the notebook computer, and particularly, is a touch display element having a touch surface S1 and a back surface S2 opposite to each other, such that a user can perform an input manipulation via the touch surface S1.

The second body 120 includes a main body 122 and a side arm 124, wherein the main body 122, for example, is a host of the notebook computer, and the side arm 124 is connected between the back surface S2 of the first body 110 and the main body 122. Furthermore, the side arm 124 has a first end E1 and a second end E2 opposite to each other, wherein the second hinge structure 140 is connected between the second end E2 and the main body 122, so that the first end E1 can rotate in relative to the second end E2. The first hinge structure 130 is disposed on the first end E1 of the side arm 124 and connected between the side arm 124 and the first body 110.

Accordingly, the side arm 124 is respectively connected with the first body 110 and the main body 122 via the first hinge structure 130 and the second hinge structure 140, so that, as shown in FIG. 1 through FIG. 3, the electronic device 100 via the side arm 124 can transform from a closed state illustrated in FIG. 1 to a open state illustrated in FIG. 2 and FIG. 3. Furthermore, the first body 110 via the side arm 124 is enabled to move from a first position P1 shown in FIG. 2 to a second position P2 shown in FIG. 3 during the open state, such that the electronic device 100 can provide the user with a more friendly and comfortable viewing angle. Moreover, the user is also enabled to adjust the first body 110 to stop at any position between the first position P1 and the second position P2 so as to choose a suitable viewing angle.

In the present embodiment, the first body 110 has a notch 112 located at the back surface S2, the first end E1 of the side arm 124 is pivoted within the notch 112. As described above, the second end E2 of the side arm 124 is pivoted to the main body 122 via the second hinge structure 140, so that the side arm 124 rotates in relative to the main body 122 about a second axis A2. Relatively, the first hinge structure 130 is pivoted between the first end E1 and the first body 110, so that the first body 110 can rotate in relative to the side arm 124 about the first axis A1, wherein the first axis A1 is parallel to the second axis A2.

Figure 4:
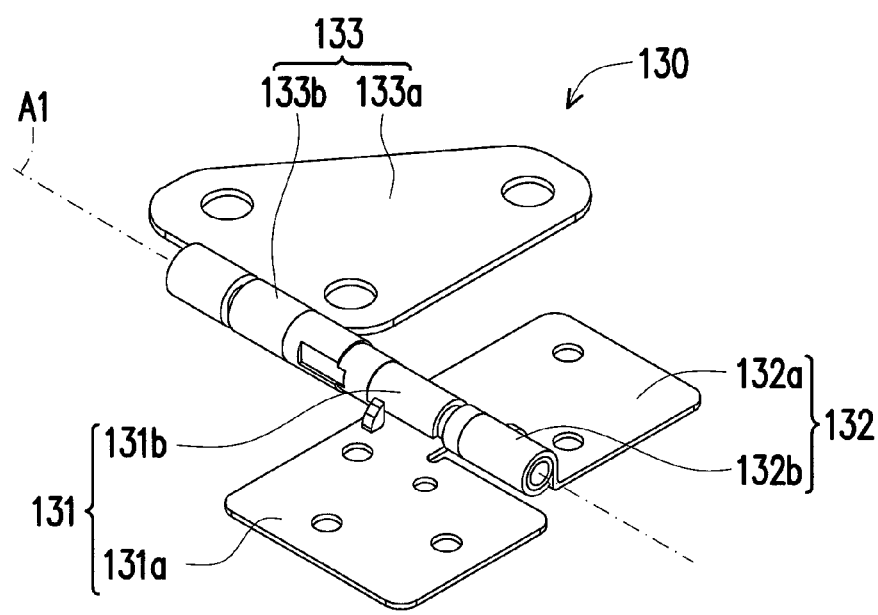
FIG. 4 is a schematic diagram illustrating a first hinge structure in FIG. 3.

FIG. 4 is a schematic diagram illustrating a first hinge structure in FIG. 3. Referring to FIG. 3 and FIG. 4, since the two opposite sides of the side arm 124 at the first end E1 thereof are respectively connected to the first body 110 via the first hinge structure 130, and the first hinge structure 130 are identically configured in symmetry, only one side of the first hinge structure 130 is taken as an example for the description in below.

In the present embodiment, the first hinge structure 130 includes a first pivoting member 131 and a second pivoting member 132 both disposed on the first body 110, and a third pivoting member 133 disposed on side arm 124 of the second body 120. The third pivoting member 133 has a third fixing portion 133a and a shaft 133b, wherein the third fixing portion 133a, for example, locks at the first end E1 of the side arm 124 with a screw (not shown) passing through an opening thereon, an end of the shaft 133b is pivoted at a side edge of the third fixing portion 133a, and the other end of the shaft 133b extends into the first body 110.

The first pivoting member 131 has a first fixing portion 131a and a first winding portion 131b extending from the first fixing portion 131a. The second pivoting member 132 has a second fixing portion 132a and a second winding portion 132b extending from the second fixing portion 132a. The first fixing portion 131a and the second fixing portion 132a, for example, respectively lock on the first body 110 with screws (not shown) passing through openings thereon, and the first winding portion 131b and the second winding portion 132b respectively extend from the first fixing portion 131a and the second fixing portion 132a and wind around the shaft 133b. As such, when the first body 110 rotates in relative to the side arm 124, the first pivoting member 131 and the second pivoting member 132 are driven to rotate in relative to the third pivoting member 133; namely, at this moment, the first winding portion 131b and the second winding portion 132b are to rotate in relative to the shaft 133b.

Figure 5:
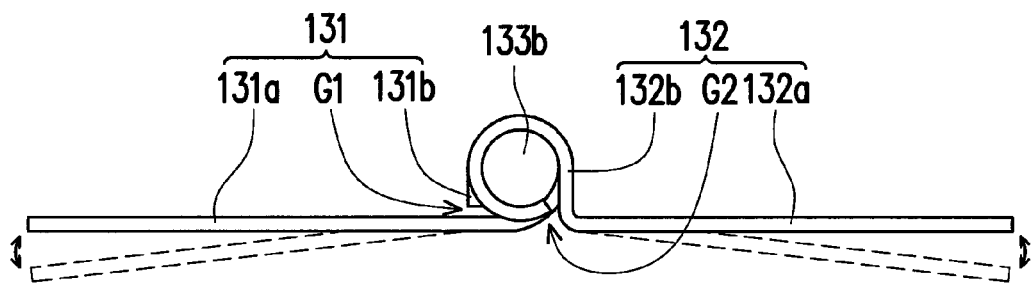
FIG. 5 is equivalent schematic diagram illustrating a first pivoting member and a second pivoting member in the first hinge structure in FIG. 4.

FIG. 5 is equivalent schematic diagram illustrating a first pivoting member and a second pivoting member in the first hinge structure in FIG. 4, and is used for illustrating a vibration of the first hinge structure when pivoting. Referring to FIG. 4 and FIG. 5, the first winding portion 131b has a first gap G1, the second winding portion 132b has a second gap G2, and the first gap G1 and the second gap G2 are located at two opposite sides of the shaft 133b. Since the gaps G1, G2 would cause deformations when the first body 110 rotates in relative to the side arm 124, the first fixing portion 131a and the second fixing portion 132a would cause vibrations. As such, in the present embodiment, the shaft 133b is to be located between the first gap G1 and the second gap G2 (viz., enabling the shaft 133b to be located between the first fixing portion 131a and the second fixing portion 132a at the same time) with different winding methods. Therefore, when the gap G1 or G2 is deformed due to rotation and thereby causes the first fixing portion 131a and the second fixing portion 132a to vibrate, and with a vibrating direction of the first fixing portion 131a and a vibrating direction of the second fixing portion 132a opposite to each other, vibrations of the fixing portions 131a and 132a (as depicted by the dashed profile in FIG. 5) may be cancelled, so that the first body 110 is effectively be placed in a stable state.

Furthermore, in the present embodiment, the first pivoting member 131 and the second pivoting member 132 respectively wind around the shaft 133b via one first winding portion 131b and one second winding portion 132b along a same direction, but the invention is not limited thereto; in another embodiment (not shown), the first winding portion and the second winding portion may also wind around the shaft with opposite directions.

Figure 6:
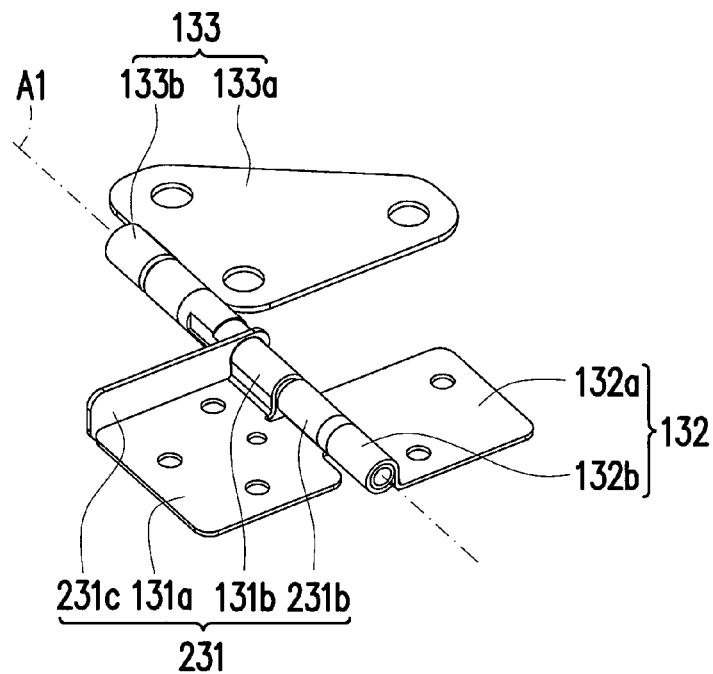
FIG. 6 is a schematic diagram illustrating a first hinge structure according to another embodiment of the invention.
Figure 7:
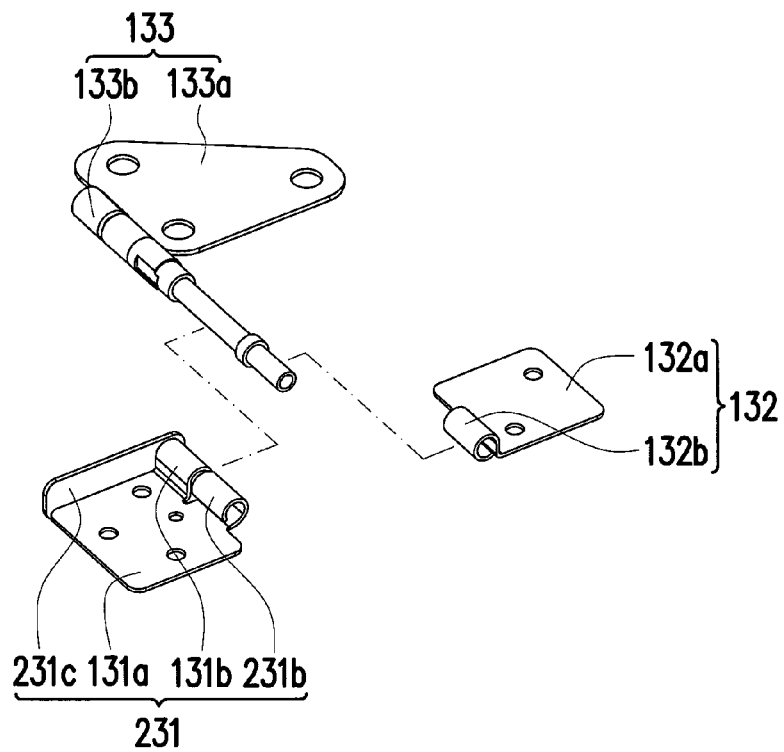
FIG. 7 is an exploded diagram of the first hinge structure in FIG. 6.

FIG. 6 is a schematic diagram illustrating a first hinge structure according to another embodiment of the invention. FIG. 7 is an exploded diagram of the first hinge structure in FIG. 6. Referring to FIG. 6 and FIG. 7, in the present embodiment, a first pivoting member 231 further has a third winding portion 231b, and the first winding portion 131b and the third winding portion 231b both extend from the first fixing portion 131a and wind around the shaft 133b. It is noted that, a direction of the first winding portion 131b winding around the shaft 133b is opposite to a direction of the third winding portion 231b winding around the shaft 133b. Moreover, on the shaft 133b of the present embodiment, the third winding portion 231b is located between the first winding portion 131b and the second winding portion 132b, and under the conditions of the figures, the second fixing portion 132a and the third fixing portion 133a are located at a same side of the shaft 133b.

On the other hand, in the present embodiment, the first pivoting member 231 further includes a structural strengthening portion 231c disposed next to the first fixing portion 131a. Furthermore, the structural strengthening portion 231c is connected with the shaft 133b of the third pivoting member 133 and the first fixing portion 131a at the same time, so that the first winding portion 131b is located between the structural strengthening portion 231c and the third winding portion 231b. This can also reduce the vibration caused by the first body 110 when it rotates in relative to the side arm 124.

Figure 8:
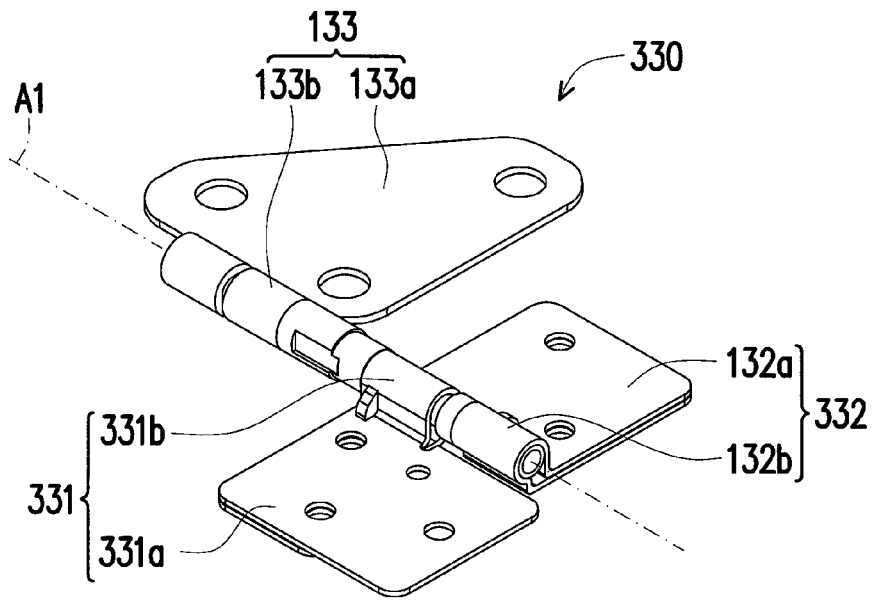
FIG. 8 is a schematic diagram illustrating a hinge structure according to yet another embodiment of the invention.
Figure 9:
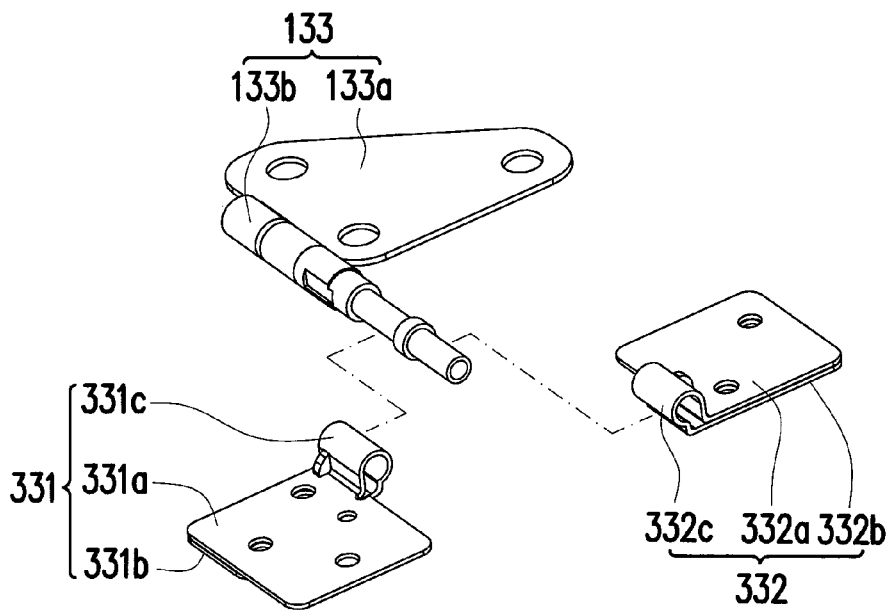
FIG. 9 is an exploded diagram of the hinge structure in FIG. 8.

FIG. 8 is a schematic diagram illustrating a hinge structure according to yet another embodiment of the invention. FIG. 9 is an exploded diagram of the hinge structure in FIG. 8. Referring to FIG. 8 and FIG. 9, different from the aforementioned embodiment, in a first hinge structure 330 of the present embodiment, a first pivoting member 331 and a second pivoting member 332 are structurally appeared as to completely cover on the shaft 133b.

Furthermore, the first pivoting member 331 includes first fixing portions 331a, 331b formed of layered structure and a first winding portion 331c connected between the first fixing portions 331a, 331b, and the second pivoting member 332 includes second fixing portions 332a, 332b formed of layered structure and a second winding portion 332c connected between the second fixing portions 332a, 332b. In other words, the first winding portion 331c and the second winding portion 332c of the present embodiment respectively and completely cover around the shaft 133b, but also cause the first fixing portions 331a, 331b and the second fixing portions 332a, 332b to locate at the two opposite sides of the shaft 133b. As a result, the effect of cancelling the vibrations similar to the aforementioned embodiment is achieved.

In summary, in the embodiments of the invention, via the first fixing portion and the second fixing portion disposed on the first body, and by enabling the shaft of the third pivoting member to be located between the first fixing portion and the second fixing portion, namely, by enabling the first winding portion of the first pivoting member and the second winding portion of the second pivoting member to wind from the two opposite sides of the shaft onto the shaft, the first and the second fixing portions located at the two opposite sides of the shaft would both generate corresponding reverse vibrations when the first body rotates in relative to the second body, and with an counteract effect of the corresponding reverse vibrations, the first body is maintained in a non-vibrating state. Furthermore, a designer may respectively wind the winding portions around the shaft with different directions according to fabrication conditions of the hinge structure, and may also increase or decrease an amount of the winding portions based on the requirements at the same time, so as to concurrently provide pivoting actions and achieve the vibration cancelling effect.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A hinge structure suited for connecting between a first body and a second body so that the first body and the second body can rotate in relative to each other, the hinge structure comprising:
   a first pivoting member having a first fixing portion and a first winding portion extending from the first fixing portion, the first fixing portion fixed on the first body;
   a second pivoting member having a second fixing portion and a second winding portion extending from the second fixing portion, the second fixing portion fixed on the first body; and
   a third pivoting member disposed on the second body, the third pivoting member having a shaft, wherein the first winding portion and the second winding portion respectively wind around the shaft, and the first fixing portion and the second fixing portion are located at two opposite sides of the shaft.

2. The hinge structure as recited in claim 1, wherein the first winding portion has a first gap, the second winding portion has a second gap, and the first gap and the second gap are located at the two opposite sides of the shaft.

3. The hinge structure as recited in claim 1, wherein a direction of the first winding portion winding around the shaft is the same as a direction of the second winding portion winding around the shaft.

4. The hinge structure as recited in claim 1, wherein a direction of the first winding portion winding around the shaft is opposite to a direction of the second winding portion winding around the shaft.

5. The hinge structure as recited in claim 1, wherein the first pivoting member or the second pivoting member further comprising at least one third winding portion adjacent to the first winding portion or the second winding portion, and a direction of the third winding portions winding around the shaft is the same as or different from that of the first winding portion of the second winding portion.

6. The hinge structure as recited in claim 1, wherein the third pivoting member further comprises a third fixing portion fixed on the second body and connected to an end of the shaft, and the shaft is pivoted at a side edge of the third fixing portion.

7. The hinge structure as recited in claim 6, wherein the third fixing portion and the first fixing portion or the second fixing portion are located at a same side of the shaft.

8. An electronic device comprising:
   a first body;
   a second body;
   a hinge structure connected between the first body and the second body, the hinge structure comprising:
      a first pivoting member having a first fixing portion and a first winding portion extending from the first fixing portion, the first fixing portion fixed on the first body;
      a second pivoting member having a second fixing portion and a second winding portion extending from the second fixing portion, the second fixing portion fixed on the first body; and
      a third pivoting member disposed on the second body, the third pivoting member having a shaft, wherein the first winding portion and the second winding portion respectively wind around the shaft, and the first fixing portion and the second fixing portion are located at two opposite sides of the shaft.

9. The electronic device as recited in claim 8, wherein the second body comprises:
   a main body; and
   a side arm having a first end and a second end, the second end pivoted to the main body, the third pivoting member disposed at the second end.

10. The electronic device as recited in claim 9, wherein the third pivoting member further comprises a third fixing portion fixed on the second end of the side arm, the shaft extends from the second end towards the first body, and the third fixing portion and the first fixing portion or the second fixing portion are located on a same side of the shaft.

11. The electronic device as recited in claim 8, wherein the first winding portion has a first gap, the second winding portion has a second gap, and the first gap and the second gap are located at the two opposite side of the shaft.

12. The electronic device as recited in claim 8, wherein a direction of the first winding portion winding around the shaft is the same as a direction of the second winding portion winding around the shaft.

13. The electronic device as recited in claim 8, wherein a direction of the first winding portion winding around the shaft is opposite from a direction of the second winding portion winding around the shaft.

14. The electronic device as recited in claim 8, wherein the first pivoting member or the second pivoting member further comprises at least one third winding portion adjacent to the first winding portion or the second winding portion, and a direction of the third winding portions winding around the shaft is the same or different from that of the first winding portion or the second winding portion.

* * * * *